US007658609B2

(12) United States Patent
Boulanov et al.

(10) Patent No.: US 7,658,609 B2
(45) Date of Patent: Feb. 9, 2010

(54) INTERNAL COMBUSTION BURNER, PARTICULARLY FOR DRAWING MINERAL FIBERS

(75) Inventors: Oleg Boulanov, Rantigny (FR); Christopher Ellison, Liancourt (FR); Jean-Luc Bernard, Clermont (FR)

(73) Assignee: Saint-Gobain Isover, Courbevoie (FR)

( * ) Notice: Subject to any disclaimer, the term of this patent is extended or adjusted under 35 U.S.C. 154(b) by 0 days.

(21) Appl. No.: 10/502,806

(22) PCT Filed: Feb. 13, 2003

(86) PCT No.: PCT/FR03/00449

§ 371 (c)(1),
(2), (4) Date: Mar. 11, 2005

(87) PCT Pub. No.: WO03/069226

PCT Pub. Date: Aug. 21, 2003

(65) Prior Publication Data

US 2005/0191590 A1    Sep. 1, 2005

(30) Foreign Application Priority Data

Feb. 13, 2002    (FR) .................................. 02 01755

(51) Int. Cl.
*F23D 14/46*    (2006.01)
*F02G 3/00*    (2006.01)
(52) U.S. Cl. .......................... 431/350; 60/749; 431/351
(58) Field of Classification Search ................. 431/350, 431/351, 115, 116, 169, 172, 181; 60/749
See application file for complete search history.

(56) References Cited

U.S. PATENT DOCUMENTS

| 1,340,226 | A |   | 5/1920  | Igou    |         |
|-----------|---|---|---------|---------|---------|
| 2,870,604 | A | * | 1/1959  | Conrad  | 60/749  |
| 2,994,367 | A |   | 8/1961  | Sherman |         |
| 3,178,161 | A | * | 4/1965  | Yeo et al. | 432/222 |
| 3,363,663 | A |   | 1/1968  | Porter  |         |
| 3,587,232 | A | * | 6/1971  | Bryce   | 60/746  |
| 3,736,094 | A | * | 5/1973  | Shisler | 431/158 |
| 3,809,062 | A |   | 5/1974  | Moore et al. |    |
| 4,445,339 | A | * | 5/1984  | Davis et al. | 60/749 |
| 4,790,744 | A | * | 12/1988 | Bellet et al. | 431/75 |
| 4,818,218 | A |   | 4/1989  | Gest    |         |
| 5,203,796 | A | * | 4/1993  | Washam et al. | 60/737 |
| 5,427,524 | A | * | 6/1995  | Lazalier | 431/350 |
| 5,551,869 | A |   | 9/1996  | Brais et al. |    |

FOREIGN PATENT DOCUMENTS

DE    427 974    4/1926
WO    98 27386    6/1998

* cited by examiner

*Primary Examiner*—Kenneth B Rinehart
*Assistant Examiner*—Chuka C Ndubizu
(74) *Attorney, Agent, or Firm*—Oblon, Spivak, McClelland, Maier & Neustadt, L.L.P.

(57) ABSTRACT

An internal combustion burner, especially for attenuation of mineral fibers, and including a combustion chamber, into which at least one duct for feeding fuel and oxidizer opens, and provided with an expansion orifice. The combustion chamber is provided with at least one flame stabilizing element, the geometry of the walls of which is chosen to create a confinement zone in which at least part of the combustion between oxidizer and fuel takes place.

26 Claims, 5 Drawing Sheets

INTERNAL COMBUSTION BURNER, PARTICULARLY FOR DRAWING MINERAL FIBERS

BACKGROUND OF THE INVENTION

1. Field of the Invention

The invention relates to an internal combustion burner capable of producing high-velocity gas streams at high temperature. More particularly, the invention relates to burners that are used in processes for forming mineral fibers, in which the attenuation of the fibers results from the gas streams emitted by said burners alone or in combination with other means such as centrifuging means or spinneret-type attenuation means. For further details about fiberizing processes using a spinner (internal centrifuging), reference may be made to patents WO 99/65835, WO 97/15532, FR-2 677 973, FR-2 576 671, FR-2 524 610, FR-2 801 301, FR-2 576 671, EP-189 354 and EP-519 797. For fiberizing by what is called external centrifuging or fiberizing with a rotor, reference may be made to the following patents: EP 991 601, WO 97/0396, WO 97/0395 and EP 465 310.

2. Discussion of the Background

Ideally, this type of burner must meet a large number of requirements as closely as possible: It must be safe and reliable. It must also have the most stable operating conditions possible, especially having a flame that does not risk being blown out, a flame that is well contained and "attached" in the combustion chamber. It is also desirable for the burner to have the least possible inertia, i.e. for it to have operating conditions that are easy to modify. The aim is also for it to be of maximum durability, to be not too complicated to manufacture, and to be compact. Moreover, it must be able to be easily fitted to the fiberizing devices with which it is combined and easily tailored to the compositions of the materials to be fiberized (which compositions determine their hot behavior, most particularly their viscosity) and to the type of mineral fibers that it is desired to obtain (especially their dimensional characteristics).

SUMMARY OF THE INVENTION

All these sometimes conflicting requirements have resulted in the construction of various types of internal combustion burner.

One useful burner is described in detail in patent EP-0 091 380 B1: The combustion chamber is fed with an oxidizer/fuel mixture and its walls, which are made of refractory cement having small asperities, are used for "attaching" the flame in order to stabilize it. The combustion chamber is also profiled so that the burnt gases follow a relatively long path along the curved walls of the combustion chamber so as to reduce the "inert" zones of the combustion chamber, that is to say zones in which a certain amount of gas could be more or less immobilized.

This burner operates satisfactorily. However, it has certain limitations intrinsic to its design. Thus, it operates well when relatively standard, that is to say quite high, burner outlet gas temperatures are intended, for example 1500 or 1600° C. However, it is more difficult to obtain perfectly stable operating conditions when lower burner outlet gas temperatures are intended, for example around 1400° C. To lower the temperature, it is possible to add oxidizer (air) to the air/gas mixture feeding the combustion chamber, but this "dilution" has limits beyond which there is a risk of the flame being extinguished. This burner operates within operating conditions constrained by both temperature and pressure parameters at the burner outlet. The operating pressure range is "narrow" and such a configuration does not allow this working range to be broadened since, at low pressure, fluctuation phenomena induced by instability of the combustion conditions in the burner occur. At high pressure, there would be a risk of the flame "detaching" from the burner and being "blown out".

It is therefore an object of the invention to improve internal combustion burners, especially so as to overcome the above-mentioned drawbacks. Its aim in particular is to obtain burners that are more flexible in operation and more adaptable in terms of gas temperature, velocity and flow rate ranges at the burner outlet. A secondary aim is to preferably obtain burners that are of low inertia, have stable operating conditions and are reliable.

A subject of the invention is firstly an internal combustion burner, especially for the attenuation of mineral fibers, comprising a combustion chamber, into which at least one duct for feeding fuel(s) and oxidizer(s) opens, and provided with an expansion orifice. The combustion chamber in question is also provided with at least one flame stabilizing element, the geometry of the walls of which is chosen so as to create a confinement zone in which at least part of the combustion between oxidizer(s) and fuel(s) takes place.

To effect combustion, the inventors have in fact adapted, and put into concrete form, the combustion principle of an afterburner chamber of an aircraft engine. In that technology, there are several flames that are held "attached" in the hot part of the afterburner chamber, with a kind of channel called a "flameholder". Even though the technical field of the invention is unrelated, the inventors have succeeded in transposing such flame attachment elements to a burner for attenuating mineral fibers. It has been found that the presence of such a flame stabilizing element is extremely effective and therefore allows the operation of the burner to be stabilized, even under operating conditions that are somewhat extreme, for example when the aim is to obtain burner outlet gases that are particularly hot or, conversely, somewhat "cold" (the terms "hot" and "cold" being, of course, relative and to be considered within the context of the technical field of the present invention, in which the temperatures are in any case at least 500 or 1000° C.).

Advantageously, it is within these confinement zones that most, preferably nearly all, or indeed all, of the combustion takes place. Thus, instead of the flame being attached to the walls of the combustion chamber, as in the case of the burner described in the aforementioned patent, the flame is attached to an additional element, which makes it possible to control, concentrate and localize the flame at the desired point in the combustion chamber. In fact, the flame stabilizer is advantageously designed as regards its geometrical shape so as to keep the zone referred to as the confinement zone in its "slipstream", this zone being a gas recirculation zone that will be explained in detail below, the residence time of these gases in this zone being long enough for the combustion to be maintained therein. The confinement zone may also be defined as a zone in which the gas velocity is lower than in the rest of the combustion chamber. Fluid stagnation is created in this confinement zone, in which the combustion may be maintained.

This confinement/recirculation zone then constitutes a stable hot-gas zone that can continuously "release" a certain flow of burnt gases.

According to the invention, the internal combustion burner, especially for the attenuation of mineral fibers, comprising a combustion chamber, into which at least one duct for feeding fuel(s) and oxidizer(s) opens, and provided with an expansion orifice, is characterized in that the combustion chamber is provided with at least one flame stabilizing element that has two solid walls substantially facing each other and joined together at one of their ends by a solid end wall so as to constitute a semi-open opening zone opposite the end wall, a confinement zone being created between the walls and near the opening, in which confinement zone at least part of the combustion between oxidizer(s) and fuel(s) takes place.

The location and the configuration of the flame stabilizer according to the invention will be able incidentally to influence the way in which the burnt gases then circulate in the combustion chamber before they are expelled via the expansion orifice. As mentioned above, the objective is generally for these burnt gases to occupy the maximum volume of the combustion chamber.

Thus, it is advantageous for the flame stabilizer(s) to be placed near the internal wall of the combustion chamber. This is, in fact, a favorable configuration, enabling the burnt gases leaving the confinement zone to be made to run along the wall of the combustion chamber and to "fill" it as much as possible during their travel inside the combustion chamber.

The combustion chamber preferably comprises a plurality of stabilizers. Let us take the convention, for greater clarity, that the burner according to the invention is in a suitable position in combination with one or more fiberizing means of the spinneret or spinner dish. In the case of a spinneret, which is presumed to be linear and placed in a horizontal plane, the burner of the invention is placed near the spinneret, which is also in a linear configuration in an approximately horizontal plane. In this case, the combustion chamber advantageously has, in this horizontal plane, a parallelogram-type cross section, for example a rectangular cross section. Furthermore, in this horizontal plane, the chamber preferably has at least two stabilizers side by side, and preferably at least (shape, size) five or ten, preferably uniformly spaced apart. The horizontal cross section of the combustion chamber and the number of stabilizers are to be selected so that it is possible to generate sufficient hot gas at the spinneret outlet, over the entire length of the latter.

In the case of a spinner "dish" (that is to say a spinner capable of rotating about a generally vertical axis, fed with molten glass, and the peripheral loop of which is pierced by a plurality of orifices), the burner according to the invention preferably has a shape that is schematically annular, since it will, as it were, surround the spinner dish. In the spinning position, and therefore in an approximately horizontal plane, the cross section of the combustion chamber will be generally annular and provided with stabilizers placed concentrically in the chamber. Here, again, it is advantageous for these stabilizers to be uniformly spaced apart.

Whether the burner is a linear burner for a spinneret or an annular-type burner for a spinner dish, the distance between two adjacent stabilizers is preferably chosen such that the streams of burnt gases emanating therefrom join up at a given distance from the stabilizers, to form a unified hot stream that is as homogeneous as possible.

Whether the burner is for a spinneret or for a spinner dish, the combustion chamber in vertical cross section (again considering the burner in combination with the fiberizing members in the fiberizing position) may have only a single stabilizer. According to another embodiment, it may have more than one of these in vertical cross section, for example two, one "on top of" the other. Here, again, the distance separating them is to be adjusted, especially so that the "sheets" of gases generated by each series of stabilizers (one series per horizontal plane) can advantageously interpenetrate. Preferably, the stabilizers of the various rows are arranged in a staggered configuration, especially so as to facilitate the circulation of air (the oxidizer) from one row to another in order, if necessary, to provide, among other functions, satisfactory cooling of all the stabilizers.

Advantageously, the flame stabilizer or stabilizers according to the invention are mostly, especially essentially all, made of metal. Also, advantageously, the stabilizers are mounted in the combustion chamber such that it is possible to adjust their positions, especially such that it is possible to make them pivot about an axis, for example the axis of the inflow of fuel.

The geometrical shape of the stabilizers may vary a great deal, provided that it makes it possible to define a confinement zone from which the burnt gases can escape. A geometrical shape having symmetry in a plane and/or along an axis may be chosen. The shape in question may especially have two symmetries in two planes perpendicular to each other.

According to a preferred embodiment, the projection of its geometrical shape perpendicular to its plane of symmetry (or to one of its planes of symmetry if there are more than one of them) has the approximate shape of a V or a U. According to another preferred embodiment, as an alternative to or in combination with the previous one, its projection perpendicular to its plane of symmetry (or to the other of its planes of symmetry if it has two of them) has the approximate shape of a triangle with rounded corners, especially an approximately isosceles triangle.

We now come to the way in which the burner is fed with oxidizer and with fuel. Advantageously, at least one feed duct, fed with fuel(s) (of the natural gas type) opens into the confinement zone of the flame stabilizer (or into at least one of them, if there are more than one stabilizer). The relative position of the outlet orifice of the duct and of the stabilizer is preferably chosen such that the gas (gases) is (are) sprayed against the walls of the stabilizer defining the confinement zone. The combustible gas is thus forced to be optimally distributed within the confinement zone. For example, the outlet orifice is placed between the walls and near the bottom of the stabilizer. Alternatively, the outlet orifice may be located at the front of the stabilizer, and so as to be offset with respect to its axis of symmetry, the stream of gas being directed toward the inside of the stabilizer. Both these configurations may be envisioned in the same burner, so it is possible to choose one or other of the outlet orifices depending on the temperature range at which the fiberizing is carried out. The terms "front" and "rear" referring to the stabilizer are defined below in the description as being close to the opening of the stabilizer and on the opposite side from the bottom of the stabilizer, and being on the opposite side from the opening and on the outside of the stabilizer so as to be opposite the bottom of the stabilizer, respectively. The feed duct may be supplied completely or almost entirely with fuel. It may also be supplied only predominantly or even only partially with fuel, the remainder consisting, for example, of oxidizer of the air type or other gases possibly participating in the combustion.

At the same time, it is advantageous to place the oxidizer (for example air, oxygen, oxygen-enriched air) feed duct(s) so that it (they) opens (open) into the combustion chamber in order to spray the oxidizer on that side of the walls of the stabilizer that is opposite the side in direct contact with the confinement zone. Schematically, a preferred embodiment therefore consists in injecting the combustible gas into the confinement zone, actually into the stabilizer or in front of the stabilizer, and in injecting the oxidizer (air) "behind" the flame stabilizer, in order to create a flow of oxidizer (air) that envelops the stabilizer, a variable portion of this air then being trapped in the confinement zone. In this situation, in which the oxidizer and fuel feeds are separate, the confinement zone will then have two purposes: The first is to provide oxidizer/fuel mixing, and the second to provide and maintain their combustion.

Here, again, the oxidizer feed duct may be fed 100% with oxidizer. However, it may also be fed alomost entirely, predominantly or partly only with oxidizer, the remainder consisting, for example, of fuel or any other gas possibly participating in the combustion.

It is thus possible to choose a gas feed duct that runs into the combustion zone and is fed with an oxidizer/fuel gas mixture in variable proportions, and a feed duct opening out "behind" the stabilizer, as explained above, which is itself fed predominantly with oxidizer of the air type: This inflow of oxidizer makes it possible, on the one hand, to modify the oxidizer/fuel ratio in the confinement zone and, on the other hand, if necessary, to "cool" the walls of the stabilizer.

As mentioned above, it is preferable for each stabilizer, when there are more than one of them, to be associated with a feed duct containing fuel and opening into its confinement zone. For example, a single feed duct containing oxidizer (typically, for example, 100% air, to take the simplest operation) may "feed" several adjacent stabilizers by suitable positioning and a suitable configuration (if it opens out "between" two adjacent stabilizers for example, and/or if it has the form of a perforated rail or a lip).

It is also envisioned within the context of the invention to choose feed ducts that convey an oxidizer/fuel mixture, the mixture having been produced before injection into the combustion chamber (another embodiment is that of one type of duct conveying 100% oxidizer or 100% fuel and the other an oxidizer/fuel mixture).

However, choosing oxidizer and fuel feed ducts that are separate is highly beneficial from the industrial standpoint, for more than one reason: It avoids a prior mixing step, mixing taking place in situ in the combustion chamber. Such eliminates any risk of the mixture exploding in the burner feed ducts. Within the context, more specific to the invention, of the use of the flame stabilizer, the characteristics of the oxidizer and of the fuel may be varied separately: The air flow rate and the gas flow rate, and their relative velocities, may be adjusted independently of each other. In point of fact, in the embodiment described above, these are parameters that will optimize the mixing of the two gases in the confinement zone. Thus, it will be possible to have combustible gas injected at high velocity into the confinement zone, which gas will be enveloped by a stream of oxidizer of the air type having, for example, a lower velocity. This creates a controllable gas exchange, and therefore a mixture that can be controlled and combustion between the two types of gases in this zone that can be optimized.

As mentioned above, it is preferred to position the flame stabilizer(s) relative to the internal wall of the combustion chamber such that the burnt gases are forced to run along at least part of this wall, especially along a path approximately in the form of a loop. It is therefore beneficial to profile the internal wall in order to maximize the path of the stream of burnt gases emanating from the confinement zone(s).

In the case of a burner suitable for a spinneret-type attenuating means, with the abovementioned conventions the geometry of the cavity defined by the walls of the combustion chamber may be the following:
    in horizontal section, its cross section may be approximately of rectangular shape;
    in vertical section, its cross section may advantageously be at least partially curved.

This may involve, for example, the juxtaposition of two portions of circles, of identical, or preferably different, radii, either joined together directly or linked to each other by straight lines. Referring this time to volumes, the combustion chamber may therefore comprise two spherical portions linked by an annular zone. Consideration may also be given to an envelope substantially ovoid in volume. Of course, many variants may be envisaged, inspired by the latter one.

In the case of a burner suitable for an attenuating means of the spinner dish type, again with the same conventions, the geometry of the cavity of the combustion chamber may be the following:
    in horizontal section, its cross section may be approximately annular;
    in vertical section, its cross section may be of the type described in respect of the burner associated with a spinneret.

The shape of the cavity defined by the combustion chamber may furthermore be such that it forces the stream of burnt gases to separate into two streams near the expansion orifice: One stream is expelled via said orifice, while the other continues its path, especially in the form of a loop, in the combustion chamber.

Advantageously, the flame stabilizing element (or at least one of them, if there are more than one) is near both the internal wall of the combustion chamber and the expansion orifice. Thus, the burnt gases may be forced to circulate from one to the other, running along the wall of the chamber, choosing the longer path to achieve this.

Advantageously, to facilitate this circulation, most, or even all, of the shape of the internal wall of the chamber is curved (in a "vertical" plane within the meaning of the invention).

According to a variant of this embodiment, a deflector is interposed between the flame stabilizer and the expansion orifice, behind which deflector the oxidizer feed duct preferably runs. This deflector may fulfill at least one of the following functions:
    preventing the possibility of burnt gases emanating from the confinement zone being expelled, having hardly emerged from this zone, via the expansion orifice, thereby ensuring that they will indeed follow a much longer path in the chamber before being expelled;
    guiding the oxidizer (air) toward the flame stabilizer, to avoid any risk of this oxidizer possibly being engulfed in the expansion orifice.

This detector may be an additional element, or may form an integral part of the internal wall of the combustion chamber by means of a suitable profile. Preferably, the expansion orifice of the combustion chamber opens into an optional afterburner chamber. This chamber preferably terminates in a lip lying at the end of a narrowing zone. The size and the shape of the cross section of this lip, and its inclination, may then be adjusted according to requirements.

Advantageously, the wall of the combustion chamber is in fact a double wall. Within the latter may flow, at least in part of it, the oxidizer (generally air) that will feed the burner before being injected into the combustion chamber: This promotes heat exchange between this gas and the chamber, allowing in particular said gas to be preheated. Provision may also be made for the combustion chamber to be equipped with external cooling means. This may be, for example, a water box system.

The internal wall, and even preferably the entire double wall when there is one, of the combustion chamber is advantageously made almost entirely of metal: A burner whose combustion chamber is made of metal, for example steel, has a longer lifetime, is easier to maintain and is lighter than a conventional burner using many refractory materials of the silica-clay type.

The burners according to the invention may be used in various fiberizing processes. In the case of the process called internal fiberizing, use is made of a spinner into which the material to be fiberized is poured, the peripheral band of said spinner being drilled with holes. Preferably, the material to be fiberized is firstly poured into a bowl drilled with holes and rotating at the same speed as the spinner, said holes allowing the peripheral band of the spinner to be fed with the material. To attenuate the cones of molten material emanating from said holes, this spinner is provided with a system of annular burners that expel gas at high velocity and at high temperature, as described in the patents cited in the preamble. In this particular case, a plurality of burners according to the invention may therefore be provided, such that they can be arranged concentrically around the spinner-type fiberizing machine.

In the case of a fiberizing process with attenuation using a spinneret, a single burner according to the invention, or several arranged in a linear fashion, may be used for providing the gas-induced attenuation of the fibers leaving the spinneret.

In the case of a fiberizing process using a spinner dish or a rotor fed with molten glass, a burner according to the invention having an overall annular shape is used.

The combustion chamber may open into an afterburner chamber. Further combustion may take place in this afterburner chamber, due possibly to the combustion of excess fuel coming from the combustion chamber. Further combustion may also be caused by introducing a certain amount of fuel into the afterburner chamber via a suitable conduit.

A subject of the invention is also a conventional internal combustion burner, which would therefore have no flame stabilizer but which provides separate oxidizer and fuel feeds for the combustion chamber and/or the geometry of the combustion chamber of which would be that described above.

BRIEF DESCRIPTION OF THE DRAWINGS

The invention will be explained in detail below with the aid of a non-limiting illustrative example, with the following figures.

DESCRIPTION OF THE PREFERRED EMBODIMENTS

Figure 1:
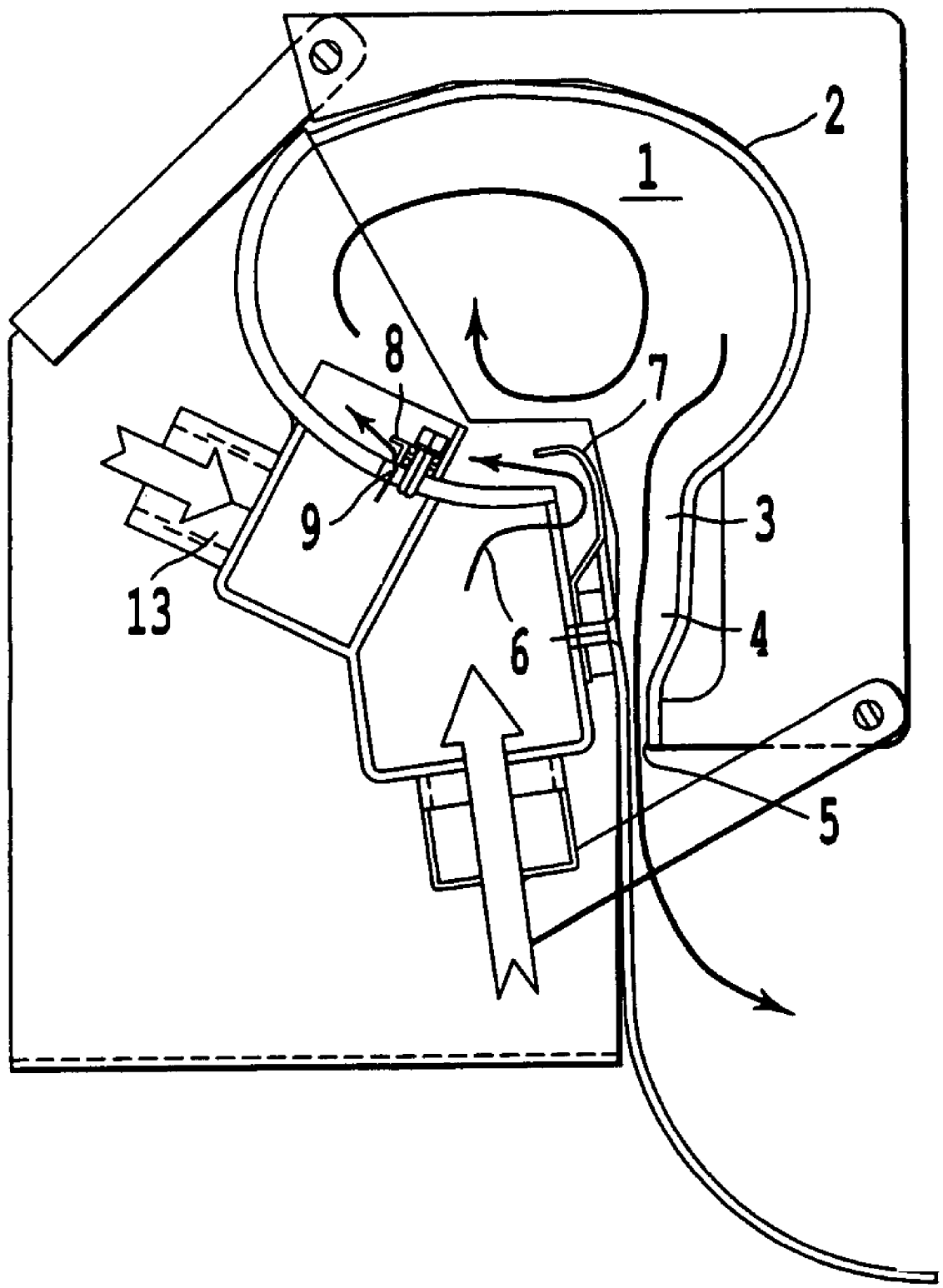
FIG. 1: is a vertical sectional drawing of an annular burner according to the invention.

These figures are schematic, and not strictly to scale in order to make them easier to examine. FIG. 1 therefore shows a burner according to the invention in its entirety, in cross section in a vertical plane. The burner is in the fiberizing position, around a spinner dish having a vertical axis of rotation (not shown). This figure is only a half-section (the burner being axisymmetric about a vertical axis).

The combustion chamber 1 is defined by the wall 2, which defines a cross section of ovoid shape. As will be more clearly understood from FIG. 3, which shows a partial cross section of the entire burner in a horizontal plane, the overall shape of the combustion chamber is annular. This burner is intended to be placed around a mineral wool spinner dish, so as to generate an annular curtain of hot gas participating in the attenuation of the filaments leaving the dish. This chamber is provided with an expansion orifice 3 that opens into an afterburner chamber 4, also of annular shape. This chamber narrows at its end and terminates in an annular lip 5. An air feed is provided, this opening via a duct 6 into the combustion chamber 1 after having flowed within the double wall of said chamber in order to preheat the air (the double wall is not shown). This stream of air is guided, by means of a deflector 7, to a flame stabilizer 8 shown in FIG 2. This stabilizer is a curved metal piece placed very close to the internal wall of the combustion chamber 1. FIG. 4 shows this in cross section: The air coming from the duct 6 arrives behind this stabilizer and envelops it, going around it. This stabilizer 8 has two walls 8a and 8b substantially facing each other and joined together at one of their ends by a curved end wall 8c so as to form a semi-open opening zone 8d opposite the end wall 8c. This stabilizer 8 defines, between the walls and the inside of the semi-open zone, part of a confinement zone 10 in which the combustion takes place, this being shown in FIGS. 2 and 4 by a gray color. The combustible gas is injected via the outlet orifice or end 9 of a feed duct 13. This end 9 is placed either inside the semi-open zone of the stabilizer, near the end wall 8c, and/or in front of the stabilizer and off-center with respect to the axis of symmetry of the stabilizer. The gas is thus injected so that it is sprayed against the walls 8a and 8b and against the end wall 8c of the stabilizer, and must then move back toward the front of the stabilizer, running along the walls. This path thus allows optimum mixing of the gas with the air, to ensure complete combustion. In addition, this spraying against the walls of the stabilizer provides additional cooling of said stabilizer.

Figure 2:
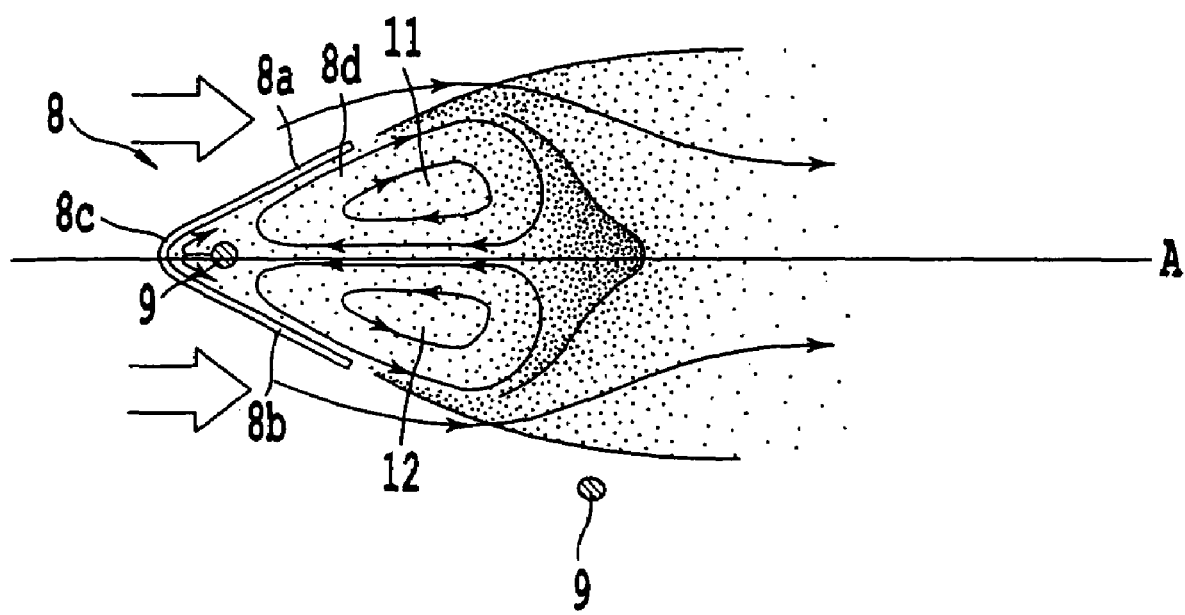
FIG. 2: is a horizontal sectional drawing of the burner according to FIG. 1.

A portion of the air will be trapped in the confinement zone 10 and mixed with the combustible gas, in order for the actual combustion to take place. FIG. 2 shows that two gas recirculation loops 11 and 12 are created in the confinement zone 10, these being shown symbolically by the arrows. The combustion is almost entirely centered in the zone 13, i.e. the boundary between the two recirculation loops 11 and 12.

For a standard attenuating gas temperature, for example around 1400 to 1600° C., the gas will be preferably injected via the end 9 located in front of the stabilizer, rather than close to the end wall of the stabilizer in the case of a cooler temperature of about 1200° C. Thus, the path traveled by the gas up to the walls 8a, 8b and the end wall 8c of the stabilizer and its return beyond the opening of the stabilizer is extended and the gas is perfectly mixed with the air in order to allow complete combustion.

The burnt gas resulting from the combustion is then expelled, along an axis A, this being an axis of symmetry of the stabilizer 8 in the plane of the cross section shown in FIG. 2. Referring once more to FIG. 1, this burnt gas, because of the shape of the stabilizer 8, will therefore be constrained to run along the wall of the combustion chamber 1 along a looped path shown symbolically by an arrow. The shape of the wall near the expansion orifice 3 is such that it forces this stream to separate into two portions near this orifice: One portion of the stream continues to "swirl" into the combustion chamber, while the remaining portion of the stream is expelled via this orifice 3. The shape of the combustion chamber therefore makes it possible to control this division of the stream, creating a head loss just upstream of the expansion orifice 3.

Before the air is introduced into the combustion chamber 1 via the duct 6, it flows within the double wall of the combustion chamber (not shown) for heat exchange with the gas flowing in the chamber.

Figure 3:
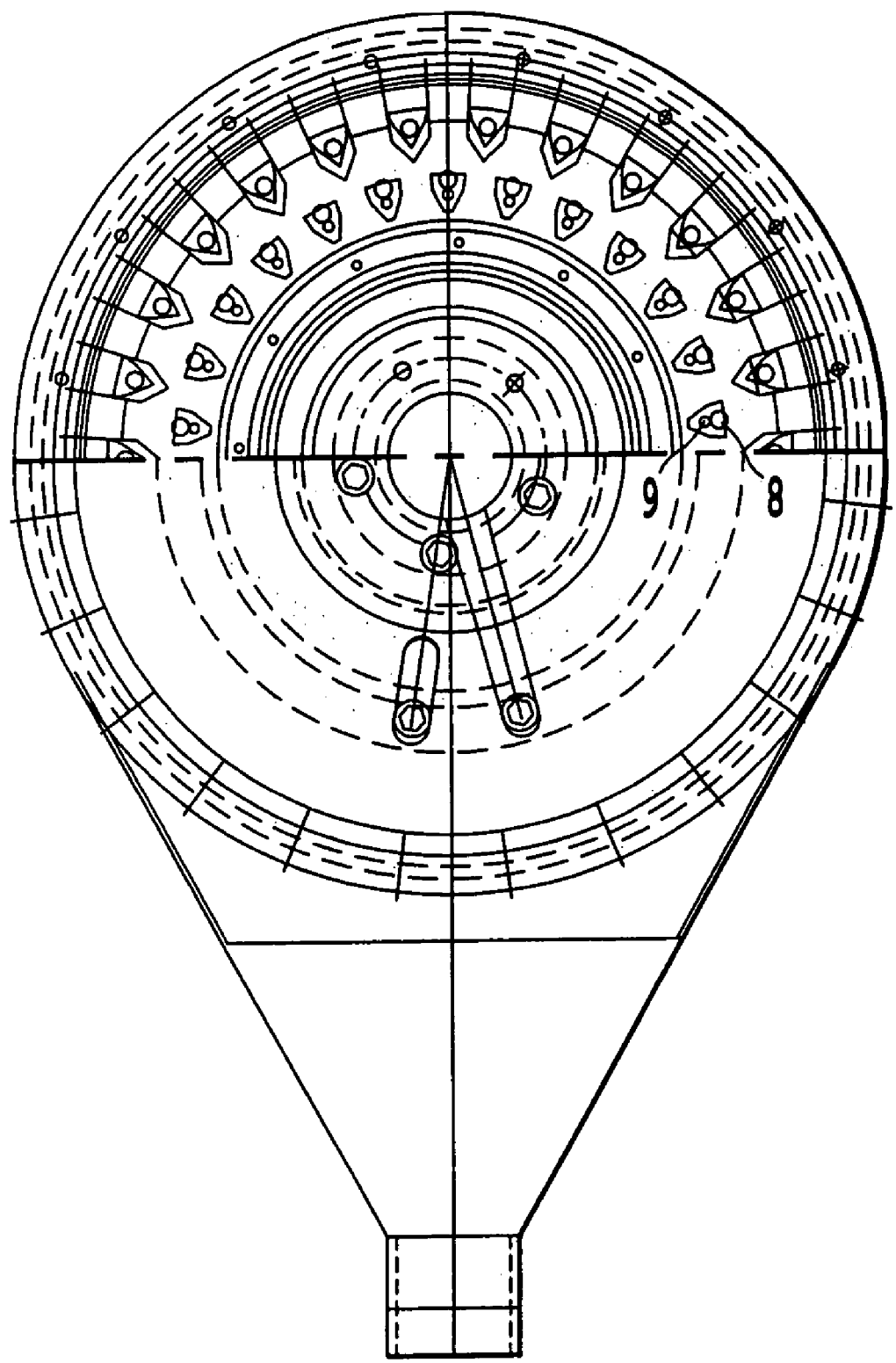
FIG. 3: is a sectional drawing of the flame stabilizer used in the combustion chamber of the burner according to FIGS. 1 and 2.
Figure 4:
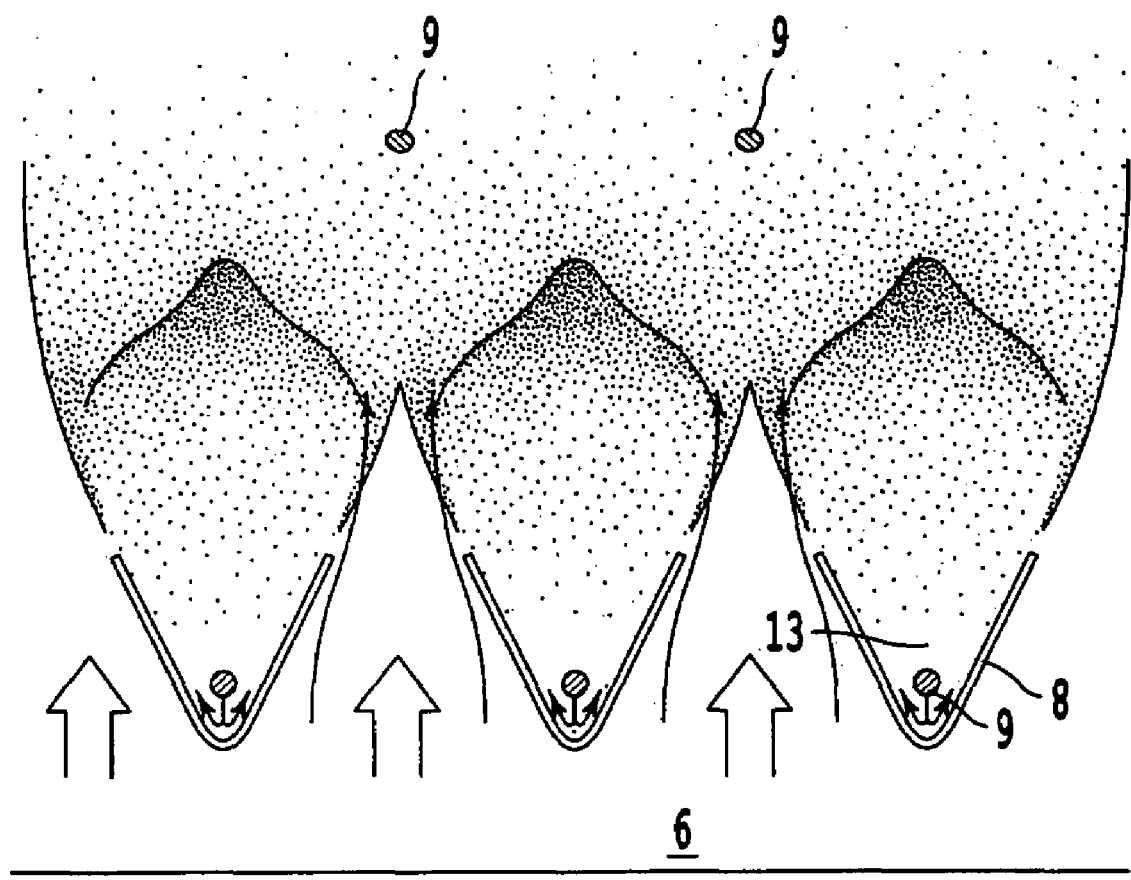
FIG. 4: is a representation of several stabilizers side by side in a linear-type burner.

FIG. 3 shows the combustion chamber of the burner, in horizontal cross section: It clearly has an annular shape, with a plurality of stabilizers 8 spaced uniformly apart concentrically and arranged so that their confinement zones face toward the "outside" of the ring (that is to say the opposite side from its virtual center). The stabilizers in this example are organized in two concentric rows. These stabilizers are uniformly spaced apart in each row. From one row to the other they are offset in a staggered fashion: This offset spacing allows the inflows of air to be able to feed air to cool the stabilizers of both rows at the same time and to cool them appropriately. Each stabilizer is fixed in the combustion chamber by mechanical means that allow its position to be adjusted and especially allow it to pivot so as to orient the flow of burnt gases emanating from its confinement zone in various ways (by pivoting, especially with respect to a radial axis of the ring that the combustion chamber forms, passing through the stabilizer in question).

In the configuration shown in FIG. 3, each stabilizer is placed such that the stream of gas escapes therefrom, in an approximately radial direction toward the "outside" of the ring. The stabilizers may thus be "inclined", especially all by the same angle relative to the abovementioned radial axis, thereby producing, as output from the burner, a tangential jet of gas.

Each of the stabilizers is provided, as described above, with an inflow of 9 to 100% fuel. However, as regards the inflow of oxidizer (air), provision may be made for a feed duct to spray air against several stabilizers at the same time. There is thus a curtain of air generated by a duct of suitable shape, which is capable of supplying fuel to at least two stabilizers at the same time in the same row and/or placed one behind the other in two different rows: The inflows of air are thus provided for the first row of stabilizers (closest to the virtual center of the ring), the excess air that they spray also reaching the second row. The spacing between two adjacent stabilizers in the same row is designed so that the streams of burnt gases that escape therefrom very quickly join up, just "after" their respective confinement zones. For greater clarity, this is illustrated with the aid of FIG. 4 (in which the stabilizers are shown, for convenience, in a line, but the situation is similar when they are placed concentrically): This shows the air, indicated symbolically by the arrows, that strikes the adjacent stabilizers, and the streams of burnt gases emanating from each of them, merging as a single continuous sheet of gas output from the confinement zone.

The combustion chamber 1 is provided with a water box. The chamber is made of metal, as is the stabilizer. A metal stabilizer may be "allowed" insofar as, when the burner is operating, its outer wall is permanently in contact with the relatively "cool" air coming from the duct 6.

A metal combustion chamber may also be "allowed", provided that a system of heat exchange with the feed air, possibly combined with a water cooling system (or another, equivalent system), has been organized. A metal structure is a major advantage in terms of durability, compactness and moderate manufacturing cost. Compared to the conventional internal combustion burners used in the fiberizing field, this type of burner has much greater operational flexibility.

Since there are separate inflows of air and combustible gas, the level of safety is very high.

This burner also has a low inertia, and ensures a rapid response when the air and fuel flow rates are adjusted. These adjustments are easy to make.

It allows a very wide temperature range of the gas output by the burner, from 200 to 1600° C., to be achieved. This is therefore a particularly advantageous burner for obtaining relatively "cool" gases, without any risk, unlike in conventional burners, of the flame detaching because of excessive dilution: The flame, within a wide air/fuel ratio range, can be maintained in the confinement zone of the stabilizer.

With such a burner, the outgoing jet of gas is remarkably stable.

Its energy/heat efficiency is also good. It is further improved when the double-wall system is used, this operating as an effective heat exchanger.

The structure of the burner thus permits modifications that are relatively easy to make. Thus, the profile of the lip 5 and of the afterburner chamber 4 may be modified, especially so as to obtain a jet of gas output at a variable angle of inclination.

Figure 5A:
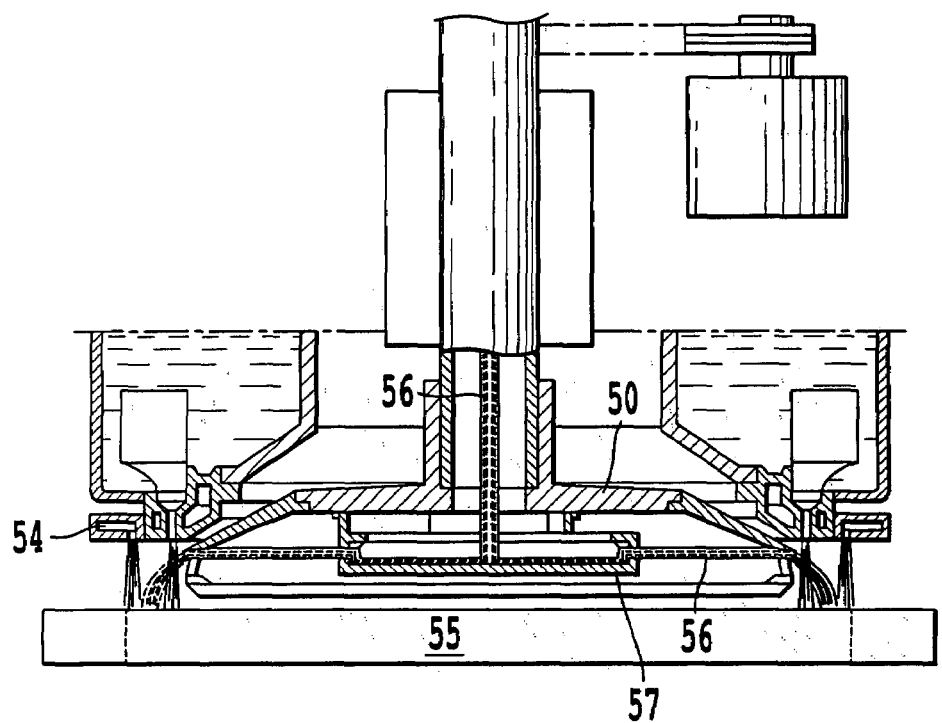
FIGS. 5a, 5b: are each a highly schematic representation of a spinner that can use the annular burner according to FIGS. 1 to 3.
Figure 5B:
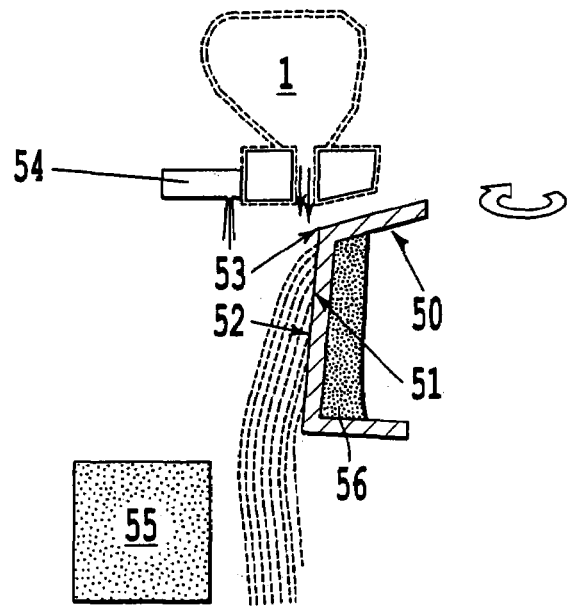

This burner opens up new possibilities in fiberizing, most particularly in "internal" fiberizing using a spinner described in the aforementioned patents. As shown highly schematically in FIG. 5, a spinner 50 is fed at its center with molten glass 56 and provided with a peripheral band 51 drilled with holes 52 distributed in rows. The material to be fiberized is poured through a hollow shaft into a bowl 57 that is mechanically connected to the spinner. The bowl 57 is itself provided with holes from which the material to be fiberized is ejected toward the peripheral band 51 when the spinner 50 and its bowl 57 are rotated. The zone 53 of the peripheral band has a shoulder and is sometimes called the "hot spot", as it is at this point that the spinner is hottest.

The spinner 50 is equipped with the annular burner according to the invention, which emits gases that will attenuate the conical streams of molten glass escaping from the holes 52 when the spinner 50 is rotated about its vertical axis. The other elements of the fiberizing plant, which, moreover, are known (especially the blowing ring 54 and the magnetic induction ring 55), will not be explained in detail.

Compared to a standard operation, the burner according to the invention allows much greater flexibility in terms of the parameters for adjusting the fiberizing by the spinner. These are especially the fiberizing temperature range, the effectiveness of the gas-induced attenuation (flow rate, temperature of the gases emanating from the burner, etc.), the speed of rotation of the spinner, or the composition of the vitrifiable material to be fiberized.

Thus, compared to a standard operation, it is now possible to choose a temperature for the gas output by the burner that is markedly lower than is customary, since this specific burner allows this, while maintaining a high ejection velocity (>100 m/s): Instead of having a gas temperature of at least 1400° C., it is possible to have a gas temperature of at most 1300° C., especially less than 1280° C., preferably between 1100 and 1250° C. The attenuating gases may thus be "cooler". At the same time, it is possible to control the viscosity of the molten vitrifiable material output by the spinner, at the hot spot of the latter (zone 53) (at which point the viscosity is lowest), to values of around 1000 poise, for example between 500 and 2000 poise, whereas in general markedly higher values are obtained, of the order of 3000 poise, at the low-viscosity point: Specifically, a less viscous molten glass is therefore obtained, this being more fluid and consequently easier to attenuate.

Among the preferred glasses that can be fiberized by internal centrifuging with the burner according to the invention, mention may be made of glasses of the borosilicate-soda-lime type, the typical properties of which are:

- a temperature corresponding to a 1000-poise viscosity ($T_{log3}$) of between about 1020 and 1100° C., especially between 1050 and 1080° C.;
- liquidus temperature ($T_{liquidus}$) between 900° C. and 950° C.

With this type of glass, for example, a hot spot temperature of at most 1200° C., especially a temperature between 950 and 1150° C., especially around 1050° C., is preferred. Compared to standard fiberizing conditions, there is a smaller temperature difference between the temperature of the glass at the hot spot and the temperature of the attenuating gases output by the burner, especially a difference of only about 100 to 200° C.

Advantageously, the temperature difference between the hot spot of the spinner and the bottom of the peripheral band (namely the lowermost row of holes) is about 40 to 80° C.

It should be noted that, to maintain the steady-state operation of the spinner, at a lower viscosity, and at the same spinner feed rate (without any break in feed from the glass reserve upstream of the spinner), it is possible to adjust at least one of the following other parameters: Reduction in the diameter of the holes in the peripheral band of the spinner (for example down to 0.1-0.3 mm) and/or to increase their number and/or adjust the speed of rotation of said spinner.

This novel method of operation has, in fact, two very beneficial effects on the quality of the fibers obtained. Firstly, the histogram of the sizes of the fibers obtained (especially the size assessed by their micronaire, in a known manner, and/or by their mean diameter) is tighter about the average value: The histogram has schematically the shape of a narrower Gaussian, with a smaller standard deviation, especially one substantially equal to half the mean diameter. For example, it is possible to have a standard deviation of about 2 microns for a mean fiber diameter of 4 microns (whereas the standard deviation is 3 or 4 more for the same mean diameter with a standard burner, all other things being equal). Furthermore, it has been found that the fibers appear to be softer to the touch, this being more pleasant for the operator who is installing the insulation wall and for the final user.

According to a second approach, a standard attenuation gas temperature may be maintained, for example around 1400 to 1600° C., but the flow rate of gas delivered by the burner may be modified/increased. The burner according to the invention may, in fact, be markedly more powerful than a conventional burner. This power may be quantified, in particular, by the amount of fuel of the methane type that it consumes per unit time. A conventional annular burner of 200 mm diameter has a power, measured in this way, of about 15 to 20 m³/h, i.e. 0.75 to 1 m³ of gas per hour and per mm of spinner diameter. The burner according to the invention may achieve powers of at least 25, 30, 35 or even 40 m³/h, i.e. powers of at least 1.25, especially at least 1.5 or 1.75 or even 2 Nm³ per hour and per mm of spinner diameter.

At the same time, the power of the burner may also be quantified by the output of gas delivered, which, in this technical field, is often expressed by measuring a burner output pressure (which can be relatively easily measured by a Pitot tube), together with the width of the lip of the burner. In this case, pressures of at least 600 to 1000 mm of water column may be achieved for a lip width of, for example, between 5 and 10 mm, whereas the pressures obtained with conventional burners are more of the order of 400 to 500 mm of water column. With such gas flow rates, to prevent the fibers, once they have been ejected from the spinner, from being turned back onto the spinner and/or onto one another, from one row of holes to the other, the speed of rotation of the spinner is modified/increased at the same time.

The advantage of this method of operation with a high gas flow rate is that the attenuation capacity of the spinner may be increased: By increasing the output per hole, that is, to say the number of kilograms fiberized per spinner hole and per day, it is, overall, possible to increase the output of the spinner. In particular, it is possible to achieve outputs of at least 1.2 to 1.5 kg per hole per day, while maintaining useful mean fiber dimensions, especially those corresponding to a fineness index expressed by a micronaire of 3 under 5 grams.

These two modes of operation are mentioned as an illustration, and the burner according to the invention allows different fiberizing parameters to be selected, and any compromise to be achieved between concerns for productivity, ease of fiberizing and quality of the mineral wool obtained.

The invention claimed is:

1. An internal combustion burner, comprising:
    a combustion chamber, into which at least one duct for feeding fuel and oxidizer opens, and provided with an expansion orifice,
    wherein the combustion chamber is provided with a plurality of flame stabilizing elements each having two solid walls substantially facing each other and joined together at one end by a solid end wall to constitute a semi-open opening zone opposite the solid end wall, a confinement zone being created between the two solid walls and near the opening zone, in which confinement zone at least part of combustion between the oxidizer and fuel takes place;
    wherein the at least one duct is connected to feed ducts fed with a gas containing one or more fuels and the feed ducts open via a plurality of outlet orifices for outputting said one or more fuels into said confinement zone, said plurality of outlet orifices being located such that each outlet orifice of said plurality is located between two adjacent flame stabilizing elements and downstream from the adjacent flame stabilizing elements so as to be offset with respect to an axis of symmetry of each flame stabilizing element,
    wherein the at least one duct includes a feed duct fed with gas containing the oxidizer and that opens into the combustion chamber so as to spray the oxidizer on a side of the walls of the flame stabilizing elements that is opposite a side in direct contact with the confinement zone of the flame stabilizing elements, and
    wherein the plurality of flame stabilizing elements are each placed near an internal wall of the combustion chamber.

2. The burner as claimed in claim 1, wherein at least a portion of the combustion between the oxidizer and fuel takes place in the confinement zone created by the flame stabilizing elements.

3. The burner as claimed in claim 1, wherein the combustion chamber comprises, in a horizontal plane, at least 5 flame stabilizing elements, placed beside one another with a uniform spacing between two adjacent elements of the flame stabilizing elements.

4. The burner as claimed in claim 3, wherein a horizontal cross section of the combustion chamber is either of parallelogram type, with a plurality of the flame stabilizing elements being placed approximately in line, or of annular type, with a plurality of the flame stabilizing elements being placed concentrically.

5. The burner as claimed in claim 1, wherein a vertical cross section of the combustion chamber is at least partly curved and has at least one stabilizing element or plural stabilizing elements lying in distinct planes.

6. The burner as claimed in claim 1, wherein each of the plurality of flame stabilizing elements is predominantly made of metal.

7. The burner as claimed in claim 1, wherein at least one of the plurality of flame stabilizing elements has a geometry with a symmetry in a plane and/or an axial symmetry, or with two symmetries in two planes perpendicular to each other.

8. The burner as claimed in claim 7, wherein at least one of the plurality of flame stabilizing elements has a projection perpendicular to one of its planes of symmetry approximately in a form of a U or a V.

9. The burner as claimed in claim 7, wherein at least one of the plurality of flame stabilizing elements has a projection perpendicular to one of the planes of symmetry thereof in an approximate shape of a triangle, or a triangle with rounded corners, or an approximately isosceles triangle shape.

10. The burner as claimed in claim 1, wherein the feed duct opening into the confinement zone is at least partially fed with fuel.

11. The burner as claimed in claim 1, wherein the feed duct that opens into the combustion chamber to spray the oxidizer onto a side of the walls of the at least one flame stabilizing element that is opposite the side in direct contact with the confinement zone, is at least partially fed with an air-type oxidizer.

12. The burner as claimed in claim 1, wherein said at least one duct includes an oxidizer feed duct and a fuel feed duct that are separated from one another.

13. The burner as claimed in claim 12, wherein the duct for feeding oxidizer and the duct for feeding fuel open into the combustion chamber are positioned in proximity with at least one flame stabilizing element so that the confinement zone of the at least one flame stabilizing element comprises both a mixing zone, for mixing an oxidizer with fuel, and a combustion zone.

14. The burner as claimed in claim 1, wherein the oxidizer and fuel are mixed in the combustion chamber.

15. The burner as claimed in claim 1, wherein a position of at least one of the plurality of flame stabilizing elements relative to an internal wall of the combustion chamber forces burnt gases to run along at least part of the internal wall.

16. The burner as claimed in claim 1, wherein an internal wall of the combustion chamber is profiled to maximize a path of burnt gases emanating from the confinement zone of at least one of the plurality of flame stabilizing elements.

17. The burner as claimed in claim 1, wherein an internal wall of the combustion chamber is profiled to force a stream of burnt gases coming from the confinement zone of at least one of the plurality of flame stabilizing elements to separate into first and second portions in proximity with the expansion orifice, the first portion being expelled via said orifice and the second portion continuing its path, in a form of a loop, in the combustion chamber.

18. The burner as claimed in claim 1, wherein at least one of the plurality of flame stabilizing elements is located in proximity with an internal wall of the combustion chamber in proximity with the expansion orifice.

19. The burner as claimed in claim 18, further comprising an oxidizer feed duct and a deflector element interposed between at least one of the plurality of flame stabilizing elements and the expansion orifice, behind which deflector said oxidizer feed duct opens.

20. The burner as claimed in claim 1, further comprising an afterburner chamber having a narrowing zone, wherein the expansion orifice opens into said afterburner chamber, said afterburner chamber terminating in a lip at an end of said narrowing zone of the afterburner chamber.

21. The burner as claimed in claim 1, wherein a wall of the combustion chamber comprises a double wall within which the oxidizer flows before opening out into the combustion chamber by the at least one feed duct.

22. The burner as claimed in claim 1, wherein an internal wall of the combustion chamber is substantially made entirely of metal.

23. The burner as claimed in claim 1 wherein the combustion chamber is provided with external cooling means.

24. The burner as claimed in claim 1, wherein the burner is combined with a mineral wool fiberizing machine of a spinneret, spinner dish, or rotor type.

25. The burner as claimed in claim 1, wherein the burner is used in a mineral wool fiberizing machine of a spinneret type, having a spinner combined with a bowl or rotor.

26. An internal combustion burner, comprising:
a combustion chamber, into which at least one duct for feeding fuel and oxidizer opens, and provided with an expansion orifice,
wherein the combustion chamber is provided with a plurality of flame stabilizing elements each having two solid walls substantially facing each other and joined together at one end by a solid end wall to constitute a semi-open opening zone opposite the solid end wall, a confinement zone being created between the two solid walls and near the opening zone, in which confinement zone at least part of combustion between the oxidizer and fuel takes place;
wherein the at least one duct is connected to feed ducts fed with a gas containing one or more fuels and the feed ducts open via a plurality of outlet orifices for outputting said one or more fuels into said confinement zone at a first velocity, said plurality of outlet orifices being located such that each outlet orifice of said plurality is located between two adjacent flame stabilizing elements and downstream from the adjacent flame stabilizing elements so as to be offset with respect to an axis of symmetry of each flame stabilizing element,
wherein the at least one duct includes a feed duct fed with gas containing the oxidizer and that opens into the combustion chamber so as to spray the oxidizer at a second velocity on a side of the walls of the flame stabilizing elements that is opposite a side in direct contact with the confinement zone of the flame stabilizing elements, and
wherein the first velocity is higher than the second velocity, such that said fuels flow from said plurality of outlet orifices to said confinement zone and the combustion occurs within the confinement zone.

\* \* \* \* \*